United States Patent
Bell et al.

(10) Patent No.: US 10,783,508 B1
(45) Date of Patent: Sep. 22, 2020

(54) PROCESSING MULTIPLE POINT-OF-SALE TRANSACTIONS

(71) Applicant: Square, Inc., San Francisco, CA (US)

(72) Inventors: Bruce Bell, New York, NY (US); Gerald Thomas Knight, New York, NY (US); Jared Travis Marr, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 672 days.

(21) Appl. No.: 15/142,966

(22) Filed: Apr. 29, 2016

Related U.S. Application Data

(63) Continuation of application No. 14/572,692, filed on Dec. 16, 2014, now abandoned.

(51) Int. Cl.
    *G06Q 20/20* (2012.01)
(52) U.S. Cl.
    CPC ......... *G06Q 20/202* (2013.01); *G06Q 20/204* (2013.01)
(58) Field of Classification Search
    CPC .... G06Q 20/20; G06Q 20/204; G06Q 20/202; G06Q 20/322; G06Q 30/0238; G07G 1/0009; G06F 3/0481; G06F 3/041; G06F 3/0482; G06F 3/1423
    See application file for complete search history.

(56) References Cited

U.S. PATENT DOCUMENTS

| 4,150,784 A | 4/1979 | Moorman et al. |
| 5,494,136 A * | 2/1996 | Humble ................. A47F 9/047 186/61 |
| 6,098,888 A | 8/2000 | Praden |
| 6,766,994 B2 | 7/2004 | Serbinski et al. |

(Continued)

FOREIGN PATENT DOCUMENTS

| GB | 2 427 059 A | 12/2006 |
| JP | 2011-070371 A | 4/2003 |

(Continued)

OTHER PUBLICATIONS

International Search Report and Written Opinion for International Application No. PCT/US2017/033370, dated Jul. 21, 2017.

(Continued)

*Primary Examiner* — Florian M Zeender
*Assistant Examiner* — Milena Racic
(74) *Attorney, Agent, or Firm* — Lee & Hayes, P.C.

(57) ABSTRACT

A point-of-sale system for concurrently processing multiple point of sale transactions, each point of sale transaction including an item input portion and a payment portion of the transaction, each portion performed in series. The point-of-sale system comprises a customer facing terminal and a merchant facing terminal. The system can comprise a plurality of customer facing terminals and can be portable. The customer facing terminal is configured to receive an input of payment information for a first point of sale transaction during a payment portion of the first point of sale transaction. The merchant facing terminal is configured to receive an input of an item selection for a second point of sale transaction during an item input portion of the second point of sale transaction and during the payment portion of the first point of sale transaction.

22 Claims, 25 Drawing Sheets

(56) References Cited

U.S. PATENT DOCUMENTS

| | | |
|---|---|---|
| 7,048,184 B2 | 5/2006 | Persky |
| 7,370,804 B2 | 5/2008 | Ishii |
| 7,712,670 B2 | 5/2010 | Sauerwein, Jr. et al. |
| 8,768,838 B1 | 7/2014 | Hoffman |
| 9,092,766 B1 | 7/2015 | Bedier et al. |
| 9,105,026 B1 | 8/2015 | Edwards |
| 9,286,494 B1 | 3/2016 | Lamfalusi et al. |
| 9,568,955 B2 * | 2/2017 | Voege ............... G07G 1/01 |
| 9,767,446 B2 * | 9/2017 | Cooke ............ G06Q 20/3278 |
| 10,325,253 B2 * | 6/2019 | Artman ........... G06Q 20/0855 |
| 2003/0164398 A1 | 9/2003 | Walker et al. |
| 2004/0034564 A1 | 2/2004 | Liu |
| 2007/0257110 A1 | 11/2007 | Schmidt et al. |
| 2008/0016456 A1 | 1/2008 | Friedland et al. |
| 2009/0006262 A1 | 1/2009 | Brown et al. |
| 2009/0012900 A1 | 1/2009 | Morin et al. |
| 2009/0094126 A1 | 4/2009 | Killian et al. |
| 2009/0164354 A1 | 6/2009 | Ledbetter et al. |
| 2009/0259516 A1 | 10/2009 | Zeevi et al. |
| 2010/0057620 A1 | 3/2010 | Li et al. |
| 2010/0128047 A1 | 5/2010 | Makino et al. |
| 2010/0128048 A1 | 5/2010 | Makino et al. |
| 2010/0235249 A1 | 9/2010 | Smith et al. |
| 2011/0059777 A1 | 3/2011 | Rao |
| 2011/0321173 A1 | 12/2011 | Weston et al. |
| 2012/0023026 A1 | 1/2012 | Chen et al. |
| 2012/0197744 A1 * | 8/2012 | Rose ............... G06Q 20/202 705/17 |
| 2012/0254038 A1 | 10/2012 | Mullen |
| 2012/0290420 A1 * | 11/2012 | Close ............... G06Q 20/20 705/17 |
| 2012/0290421 A1 | 11/2012 | Qawami et al. |
| 2013/0006847 A1 | 1/2013 | Hammad et al. |
| 2013/0144731 A1 | 6/2013 | Baldwin et al. |
| 2013/0282501 A1 | 10/2013 | Edwards et al. |
| 2013/0299574 A1 | 11/2013 | Theobald |
| 2014/0022211 A1 | 1/2014 | Karpin et al. |
| 2014/0047390 A1 | 2/2014 | Thorsander et al. |
| 2014/0071043 A1 | 3/2014 | Jung et al. |
| 2014/0095387 A1 | 4/2014 | Colnot |
| 2014/0108108 A1 | 4/2014 | Artman et al. |
| 2014/0249951 A1 | 9/2014 | Gotanda et al. |
| 2015/0019356 A1 | 1/2015 | Bagdonas et al. |
| 2015/0095133 A1 * | 4/2015 | Parker ............. G06Q 20/202 705/14.38 |
| 2015/0185768 A1 | 7/2015 | Voege et al. |
| 2015/0199668 A1 | 7/2015 | Fernando et al. |
| 2015/0199882 A1 | 7/2015 | Fernando et al. |
| 2015/0287012 A1 | 10/2015 | Takasu et al. |
| 2015/0332382 A1 | 11/2015 | Aso et al. |
| 2015/0338917 A1 | 11/2015 | Steiner et al. |
| 2015/0363757 A1 | 12/2015 | Mocko et al. |
| 2016/0063563 A1 | 3/2016 | Fernandez et al. |
| 2016/0070964 A1 | 3/2016 | Conrad |
| 2016/0117529 A1 | 4/2016 | Bedier et al. |
| 2016/0117659 A1 | 4/2016 | Bedier et al. |
| 2016/0117662 A1 | 4/2016 | Bedier et al. |
| 2016/0124627 A1 | 5/2016 | Beatty et al. |
| 2016/0125449 A1 | 5/2016 | Beatty et al. |
| 2016/0148023 A1 | 5/2016 | Lamfalusi et al. |
| 2016/0335461 A1 | 11/2016 | Lamfalusi et al. |
| 2016/0335462 A1 | 11/2016 | Lamfalusi et al. |
| 2017/0076269 A1 | 3/2017 | Saeed et al. |
| 2017/0364888 A1 | 12/2017 | Bell et al. |
| 2018/0039965 A1 | 2/2018 | Han et al. |
| 2018/0137491 A1 | 5/2018 | Sanders et al. |
| 2018/0150817 A1 | 5/2018 | Han et al. |
| 2019/0102764 A1 | 4/2019 | Pattarawuttiwong |

FOREIGN PATENT DOCUMENTS

| | | |
|---|---|---|
| WO | 2013/051032 A1 | 4/2013 |
| WO | 2015/001468 A1 | 1/2015 |
| WO | 2015/191468 A1 | 12/2015 |
| WO | 2016/069775 A1 | 5/2016 |
| WO | 2016/081804 A1 | 5/2016 |
| WO | 2017/222696 A1 | 12/2017 |

OTHER PUBLICATIONS

Notice of Acceptance for Australian Patent Application No. 2015349752, dated Jul. 3, 2017.
Non-Final Office Action dated Jul. 20, 2016, for U.S. Appl. No. 14/848,123, of Guise, M., et al., filed Sep. 8, 2015.
Non-Final Office Action dated Aug. 25, 2016, for U.S. Appl. No. 15/220,262, of Lamfalusi, M.C., et al., filed Jul. 26, 2016.
Non-Final Office Action dated Aug. 25, 2016, for U.S. Appl. No. 15/221,383, of Lamfalusi, M.C., et al., filed Jul. 27, 2016.
Notice of Allowance dated Jan. 5, 2017, for U.S. Appl. No. 15/220,262, of Lamfalusi, M.C., et al., filed Jul. 26, 2016.
Final Office Action dated Jan. 27, 2017, for U.S. Appl. No. 14/848,123, of Guise, M., et al., filed Sep. 8, 2015.
Examination Report No. 1 for Australian Patent Application No. 2017245444, dated Dec. 1, 2017.
Non-Final Office Action dated Mar. 13, 2015, for U.S. Appl. No. 14/572,692, of Bell, B., et al., filed Dec. 16, 2014.
Non-Final Office Action dated May 21, 2015, for U.S. Appl. No. 14/592,102, of Chen, Y., et al., filed Jan. 8, 2015.
Final Office Action dated Jul. 10, 2015, for U.S. Appl. No. 14/572,692, of Bell, B., et al., filed Dec. 16, 2014.
Non-Final Office Action dated Sep. 16, 2015, for U.S. Appl. No. 14/549,338, of Lamfalusi, M.C., et al., filed Nov. 20, 2014.
Notice of Allowance dated Nov. 10, 2015, for U.S. Appl. No. 14/549,338, of Lamfalusi, M.C., et al., filed Nov. 20, 2014.
Final Office Action dated Dec. 9, 2015, for U.S. Appl. No. 14/592,102, of Chen, Y., et al., filed Jan. 8, 2015.
Non-Final Office Action dated Jan. 14, 2016, for U.S. Appl. No. 14/947,162, of Lamfalusi, M.C., et al., filed Nov. 20, 2015.
Non-Final Office Action dated Mar. 11, 2016, for U.S. Appl. No. 14/572,692, of Bell, B., et al., filed Dec. 16, 2014.
Notice of Allowance dated Mar. 25, 2016, for U.S. Appl. No. 14/947,162, of Lamfalusi, M.C., et al., filed Nov. 20, 2015.
International Search Report and Written Opinion for PCT Application No. PCT/US2015/051082 dated Dec. 18, 2015.
International Search Report and Written Opinion for PCT Application No. PCT/US2015/051090 dated Dec. 21, 2015.
International Search Report and Written Opinion for PCT Application No. PCT/US2015/061771 dated Jan. 29, 2016.
"At a Glance PCI Data Storage, PCI Data Storage Do's and Don'ts," PCI Security Standards Council LLC, dated Dec. 31, 2008, Retrieved from the Internet URL: http://web.archive.org/web/20140704155237/ https://www.pcisecuritystandards.org/pdfs/pci_fs_data_storage.pdf, on Feb. 8, 2017, pp. 1-2.
Notice of Allowance dated Apr. 21, 2017, for U.S. Appl. No. 15/221,383, of Lamfalusi, M.G., et al., filed Jul. 26, 2016.
International Search Report and Written Opinion for PCT Application No. PCT/US2016/068914 dated Feb. 16, 2017.
Non-Final Office Action dated Oct. 4, 2018, for U.S. Appl. No. 15/188,711, of Bell, B., et al., filed Jun. 21, 2016.
Non-Final Office Action dated Oct. 18, 2019, for U.S. Appl. No. 15/720,749, of Han, K., et al., filed Sep. 29, 2017.
Notice of Allowance dated Dec. 16, 2019, for U.S. Appl. No. 15/496,529, of Han, K., et al., filed Apr. 25, 2017.
Examiner Requisition for Canadian Patent Application No. 3,027,525, dated Oct. 9, 2019.
Examination report for Australian Patent Application No. 2017281243, dated Nov. 13, 2019.
Non-Final Office Action dated Mar. 19, 2019, for U.S. Appl. No. 15/496,529, of Han, K. filed Apr. 25, 2017.
Notice of Allowance dated Jul. 25, 2019, for U.S. Appl. No. 15/188,711, of Bell, B., et al., filed Jun. 21, 2016.
Final Office Action dated Sep. 11, 2019, for U.S. Appl. No. 15/496,529, of Han, K., et al., filed Apr. 25, 2017.
English-language translation of Decision of Refusal for Japanese Patent Application No. 2018-566523, dated Feb. 3, 2020.

(56) References Cited

OTHER PUBLICATIONS

Non-Final Office Action dated Jan. 27, 2020, for U.S. Appl. No. 15/723,030, of Pattarawuttiwong, S., filed Oct. 2, 2017.
Final Office Action dated Apr. 15, 2020, for U.S. Appl. No. 15/720,749, of Han, K., et al., filed Sep. 29, 2017.
Notice of Allowance dated May 13, 2020, for U.S. Appl. No. 15/723,030, of Pattarawuttiwong, S., filed Oct. 2, 2017.

* cited by examiner

| 3 Orders | 2 Messages | | | ○ | | 9:23 PM 🛜 |
|---|---|---|---|---|---|---|
| All Items | Luca Brasi | Monte Cristo | Greenpoint Benedict | | | ⌄ ← 410 |
| Salads and Soup | Red White and Greenberg | Ricotta Be Kiddin Me | Spectacle 261 | | Tickets | New Ticket ← 430 |
| Pizza | King Harry Classic | Feel Like Bacon Love | Delboy | | MINE | |
| Desserts | Hometown Brisket | Hellboy 422 | Ricky Ricotta | | Bruce Hometown Brisket, Ricotta Be Kiddin Me, Ga... | 12 min |
| Beverages | Hellified Porkpie White | Anise and Anephew | Cherry Jones | | Jerry Hellboy x 4, The Gates of Eden, Gazpacho, H... | 8 min |
| Discounts | | Regina | | | Matt Sweet Action x 12 | 15 min |
| Gift Cards | | Daniela Spinaci | 420 | | Radric King Harry Classic x 16, Cherry Jones x 4, Gre... | 2 min |
| Keypad | Brian DeParma | | | | ALL | |
| | Greenpointer | | | | Jared Monte Cristo, Greenpoint Benedict, Luca Bra... | 14 min |
| | Lacinato Red | A Whiter Shade of Kale | | | Mila A Whiter Shade of Kale, House Red | 6 min |
| Logout MJ | | | | | Travis | 10 min |

FIG. 4A

| 3 Orders | 2 Messages | | | 9:23 PM |
|---|---|---|---|---|
| All Items | | | | |
| Salads and Soup | Luca Brasi | Monte Cristo | Greenpoint Benedict | Current Sale |
| Pizza | Red White and Greenberg | Ricotta Be Kiddin Me | Spectacle 261 | Sweet Action x 2 — $10.00 |
| | | | | The Gates of Eden — $14.00 |
| | King Harry Classic | Feel Like Bacon Love | Delboy | Chicken $4.00 |
| Desserts | | | | No Cheese |
| | Hometown Brisket | Hellboy | Ricky Ricotta | Gazpacho — $8.00 |
| Beverages | Hellified Porkpie White | Anise and Anephew | Cherry Jones | Hellboy — $17.00 |
| Discounts | | | | Greenpointer — $18.00 |
| | Brian DeParma | Regina | | Prosciutto di Parma $3.00 |
| Gift Cards | Greenpointer | Daniela Spinaci | 420 | Tax — $6.70 |
| Keypad | Lacinato Red | A Whiter Shade of Kale | | |
| | | | | $74  $75  $80  $100 |
| Logout MJ | | | | Save        $73.70 |

510 (top); 520 (bottom)

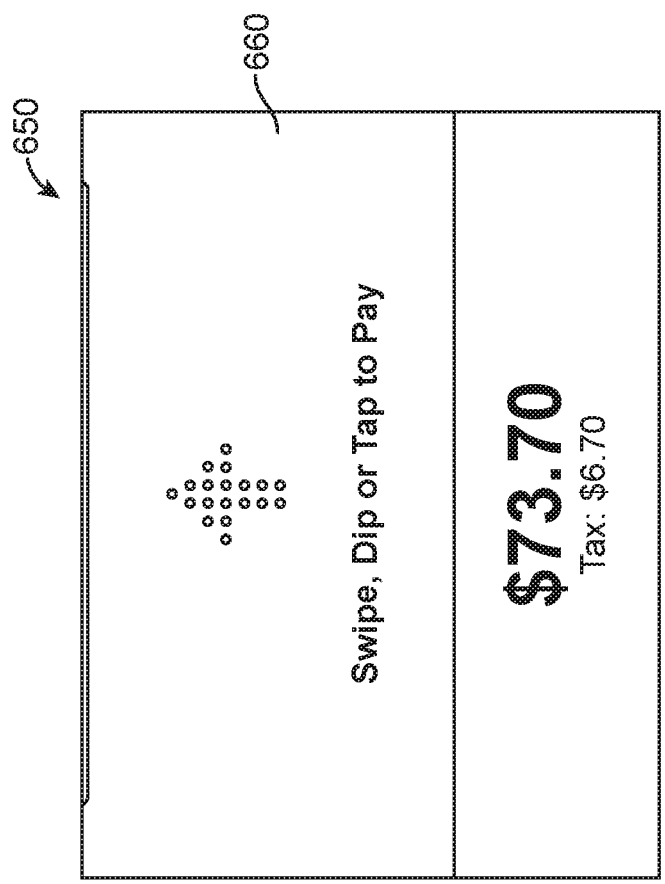

| 3 Orders | 2 Messages | | = | | Amex 1234 | |
|---|---|---|---|---|---|---|
| All Items | Luca Brasi | Monte Cristo | Greenpoint Benedict | | Tickets | |
| Salads and Soup | Red White and Greenberg | Ricotta Be Kiddin Me | Spectacle 261 | | IN PROGRESS | New Ticket — 730 |
| Pizza | King Harry Classic | Feel Like Bacon Love | Delboy | | Current Sale — 740 Ricky Ricotta, Coke x 2, Beans and Rice, Cor... MINE | |
| Desserts | Hometown Brisket | Hellboy | Ricky Ricotta | | Bruce Hometown Brisket, Ricotta Be Kiddin Me, Ga... | 12 min |
| Beverages | Hellified Porkpie White | Anise and Anephew | Cherry Jones | | Jerry Hellboy x 4, The Gates of Eden, Gazpacho, H... | 8 min |
| Discounts | | | | | Matt Sweet Action x 12 | 15 min |
| Gift Cards | Brian DeParma | Regina | <u>420</u> | | Radric King Harry Classic x 16, Cherry Jones x 4, Gre... ALL | 2 min |
| Keypad | Greenpointer | Daniela Spinaci | | | Jared Monte Cristo, Greenpoint Benedict, Luca Bra... | 14 min |
| Logout MJ | Lacinato Red | A Whiter Shade of Kale | | | | |

FIG. 7A

| 3 Orders | 2 Messages | | | Choosing Account ←810 820 |
|---|---|---|---|---|
| All Items | Luca Brasi | Monte Cristo | Greenpoint Benedict | Tickets ⌵ |
| Salads and Soup | Red White and Greenberg | Ricotta Be Kiddin Me | Spectacle 261 | New Ticket ←830 |
| Pizza | King Harry Classic | Feel Like Bacon Love | Delboy | IN PROGRESS |
| | | | | Current Sale Ricky Ricotta, Coke x 2, Beans and Rice, Cor... |
| Desserts | Hometown Brisket | Hellboy | Ricky Ricotta | MINE |
| Beverages | Hellified Porkpie White | Anise and Anephew | Cherry Jones | Bruce 12 min Hometown Brisket, Ricotta Be Kiddin Me, Ga... |
| Discounts | | | | Jerry 8 min Hellboy x 4, The Gates of Eden, Gazpacho, H... |
| Gift Cards | Brian DeParma | Regina | | Matt 15 min Sweet Action x 12 |
| Keypad | Greenpointer | Daniela Spinaci | 420 | Radric 2 min King Harry Classic x 16, Cherry Jones x 4, Gre... ALL |
| | Lacinato Red | A Whiter Shade of Kale | | Jared 14 min Monte Cristo, Greenpoint Benedict, Luca Bra... |
| Logout MJ | | | | |

FIG. 8A

| 3 Orders | 2 Messages | | | Choosing Account |
|---|---|---|---|---|
| All Items | Luca Brasi | Monte Cristo | Greenpoint Benedict | $73.70 |
| Salads and Soup | Red White and Greenberg | Ricotta Be Kiddin Me | Spectacle 261 | Amex 1234 • Milena |
| Pizza | King Harry Classic | Feel Like Bacon Love | Delboy 1022 | Cancel Sale |
| Desserts | Hometown Brisket | Hellboy | Ricky Ricotta | Ricky Ricotta; Coke x 2; Beans and Rice Cor... MINE |
| Beverages | Hellified Porkpie White | Anise and Anephew | Cherry Jones | Bruce 12 min Hometown Brisket; Ricotta Be Kiddin Me; Ga... |
| Discounts | | Regina | | Jerry 8 min Hellboy x 4; The Gates of Eden; Gazpacho; H... |
| Gift Cards | Brian DeParma | Daniela Spinaci | 420 | Matt 15 min Sweet Action x 12 |
| Keypad | Greenpointer | | | Radric 2 min King Harry Classic x 16; Cherry Jones x 4; Gre... ALL |
| | Lacinato Red | A Whiter Shade of Kale | | Jared 14 min Monte Cristo; Greenpoint Benedict; Luca Bra... |
| Logout MJ | | | | |

FIG. 9A

| 3 Orders | 2 Messages | | | Choosing Account |
|---|---|---|---|---|
| All Items | Luca Brasi | Monte Cristo | Greenpoint Benedict | Tickets |
| Salads and Soup | Red White and Greenberg | Ricotta Be Kiddin Me | Spectacle 261 | New Ticket — 1032 |
| Pizza | King Harry Classic | Feel Like Bacon Love | Delboy  1022 | IN PROGRESS |
| Desserts | Hometown Brisket | Hellboy | Ricky Ricotta | Current Sale<br>Ricky Ricotta, Coke x 2, Beans and Rice, Cor...<br>MINE |
| Beverages | Hellified Porkpie White | Anise and Anephew | Cherry Jones | Bruce                                           12 min<br>Hometown Brisket, Ricotta Be Kiddin Me, Ga... |
| Discounts | | | | Jerry                                             8 min<br>Hellboy x 4, The Gates of Eden, Gazpacho, H... |
| Gift Cards | Brian DeParma | Regina | | Matt                                            15 min<br>Sweet Action x 12 |
| Keypad | Greenpointer | Daniela Spinaci | 420 | Radric                                          2 min<br>King Harry Classic x 16, Cherry Jones x 4, Gre...<br>ALL |
| Logout MJ | Lacinato Red | A Whiter Shade of Kale | | Jared                                          14 min<br>Monte Cristo, Greenpoint Benedict, Luca Bra... |

FIG. 10A

| 3 Orders | 2 Messages |
|---|---|

| | | | | Choosing Account ∨ | 1112 |

| All Items | Luca Brasi | Monte Cristo | Greenpoint Benedict | Current Sale | |
| Salads and Soup | Red White and Greenberg | Ricotta Be Kiddin Me | Spectacle 261 | Delboy | $10.00 |
| Pizza | King Harry Classic | Feel Like Bacon Love | Delboy | Tax | $1.00 |
| Desserts | Hometown Brisket | Hellboy | Ricky Ricotta | | |
| Beverages | Hellified Porkpie White | Anise and Anephew | Cherry Jones | | |
| Discounts | | Regina | | | |
| Gift Cards | Brian DeParma | Daniela Spinaci | 420 | | |
| Keypad | Greenpointer | A Whiter Shade of Kale | | $11 $15 $20 $50 | |
| | Lacinato Red | | | Save $11.00 | 1120 |
| Logout MJ | | | | | |

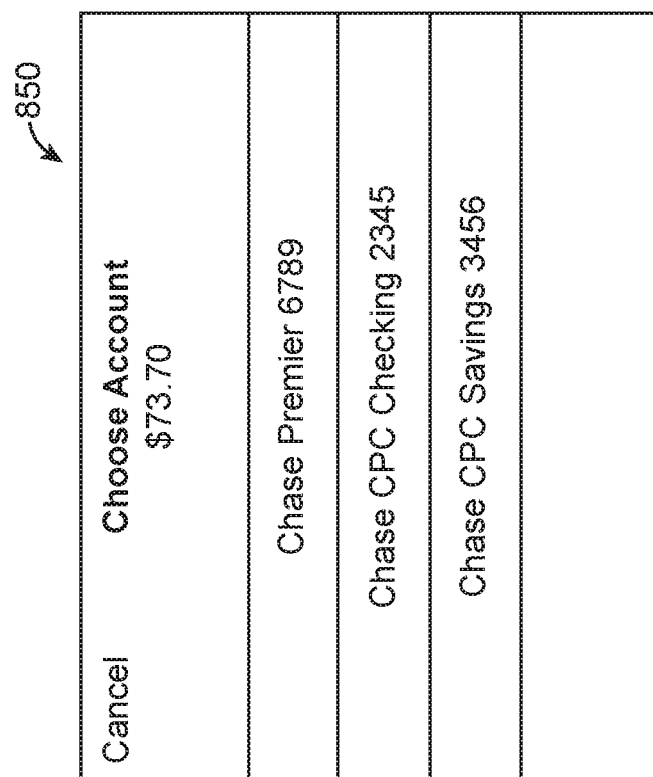

| 3 Orders | 2 Messages |

Current Sale — Choosing Account ⌄

| | | | |
|---|---|---|---|
| All Items | Luca Brasi | Monte Cristo | Greenpoint Benedict |
| Salads and Soup | Red White and Greenberg | Ricotta Be Kiddin Me | Spectacle 261 |
| Pizza | King Harry Classic | Feel Like Bacon Love | Delboy |
| Desserts | Hometown Brisket | Hellboy | Ricky Ricotta |
| Beverages | Hellified Porkpie White | Anise and Anephew | Cherry Jones |
| Discounts | | | |
| Gift Cards | Brian DeParma | Regina | |
| Keypad | Greenpointer | Daniela Spinaci | 420 |
| | Lacinato Red | A Whiter Shade of Kale | |
| Logout MJ | | | |

Delboy  $10.00
Tax  $1.00

1320 → $11  $15  $20  $50

Save  $11.00

3 Orders | 2 Messages

All Items
Salads and Soup
Pizza
Desserts
Beverages
Discounts
Gift Cards
Keypad
Logout MJ Luca Brasi | Monte Cristo | Greenpoint Benedict
Red White and Greenberg | Ricotta Be Kiddin Me | Spectacle 261
King Harry Classic | Feel L
Hometown Brisket | Hellbo
Hellified Porkpie White | Anise
| | Regin
Brian DeParma | Daniela Spinaci | 420
Greenpointer | A Whiter Shade of Kale
Lacinato Red 1420
$0.05 Change
Out of $73.75  1422
OK
1424  Queue Receipt Choosing Account Current Sale
Delboy          $10.00
Tax             $1.00

$11   $15   $20   $50
Save            $11.00

PROCESSING MULTIPLE POINT-OF-SALE TRANSACTIONS

CROSS-REFERENCE TO RELATED APPLICATIONS

This application is a continuation of U.S. application Ser. No. 14/572,692, filed on Dec. 16, 2014, entitled "PROCESSING MULTIPLE POINT-OF-SALE TRANSACTIONS", which is hereby expressly incorporated herein by reference in its entirety.

BACKGROUND

Consumers can interact with merchants to conduct various financial payment transactions. For example, a consumer can conduct a transaction with a merchant at a point-of-sale system using cash, a transaction card, or other transaction instrument. Conventional systems can include expensive and bulky financial transaction electronics, as may include a card reader for payment cards (e.g., debit or credit cards), a cash drawer, monitors, keyboards, and various other electronic devices. Oftentimes, however, this equipment can be costly and large, requiring additional space and resources. Further, in retail stores where space is limited, a merchant may not require all components that come with conventional point-of-sale system or at least may find it desirable to piece together a modular or mobile system to streamline the checkout experience. Further still, merchants may find approaches to conducting a financial transaction using conventional systems burdensome, where during a transaction, if a customer pays by credit card, the merchant has to enter a transaction amount and the merchant or the customer has to swipe the credit card in the card reader. Further, many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN), many of which techniques require additional financial transaction electronics and time. Some point-of-sale systems require multiple types of card readers and/or complex and bulky card-reading equipment in order to accept multiple types of payment cards. As the number of transactions increases, it is increasingly more time consuming to perform each transaction and even more time consuming to perform multiple transactions.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A illustrates an example view of a merchant facing terminal of a point-of-sale system displaying a merchant graphical user interface (GUI) in a "null" or ready state, in accordance with some embodiments;

FIG. 5A illustrates an example view of a merchant facing terminal of a point-of-sale system displaying a merchant GUI after a merchant has selected an item to input for a first point-of-sale transaction, in accordance with some embodiments;

FIG. 6A illustrates an example view of a merchant facing terminal displaying a merchant GUI showing payment options, in accordance with some embodiments;

FIG. 6B illustrates an example view of a customer facing terminal displaying a customer GUI that is prompting the customer to start the payment portion for the first point-of-sale transaction, in accordance with some embodiments;

FIG. 7A illustrates an example view of a merchant facing terminal and displaying options available to a merchant once the item input portion of the first point-of-sale transaction is complete and control of the first point-of-sale transaction is transferred to the customer facing terminal, in accordance with some embodiments;

FIG. 8A illustrates an example view of a merchant facing terminal displaying a merchant GUI for a merchant to initiate a second point-of-sale transaction, in accordance with some embodiments;

FIG. 9A illustrates an example view of a merchant facing terminal displaying a merchant GUI with the options available to the merchant for participating in the payment portion of the first point-of-sale transaction, in accordance with some embodiments;

FIG. 10A illustrates an example view of a merchant facing terminal displaying a merchant GUI for performing an item input portion for a second point-of-sale transaction, in accordance with some embodiments;

FIG. 11A illustrates an example view of a merchant facing terminal displaying a merchant GUI for allowing a merchant to select the total amount of the sale and complete the item input portion for the second point-of-sale transaction, in accordance with some embodiments;

FIG. 12A illustrates an example view of a merchant facing terminal displaying a merchant GUI showing options available to merchant for performing the payment portion of the second point-of-sale transaction, in accordance with some embodiments;

FIG. 12B illustrates an example view of a customer facing terminal displaying a customer GUI showing the customer continuing the payment portion of the first point-of-sale transaction, in accordance with some embodiments;

FIG. 13A illustrates an example view of a merchant facing terminal displaying a merchant GUI showing a merchant's ability to make a selection of a dollar amount to be paid to the merchant, in accordance with some embodiments;

FIG. 14A illustrates an example view of a merchant facing terminal displaying a merchant GUI showing the change available to a customer of the second point-of-sale transaction, in accordance with some embodiments.

DETAILED DESCRIPTION

Figure 1:
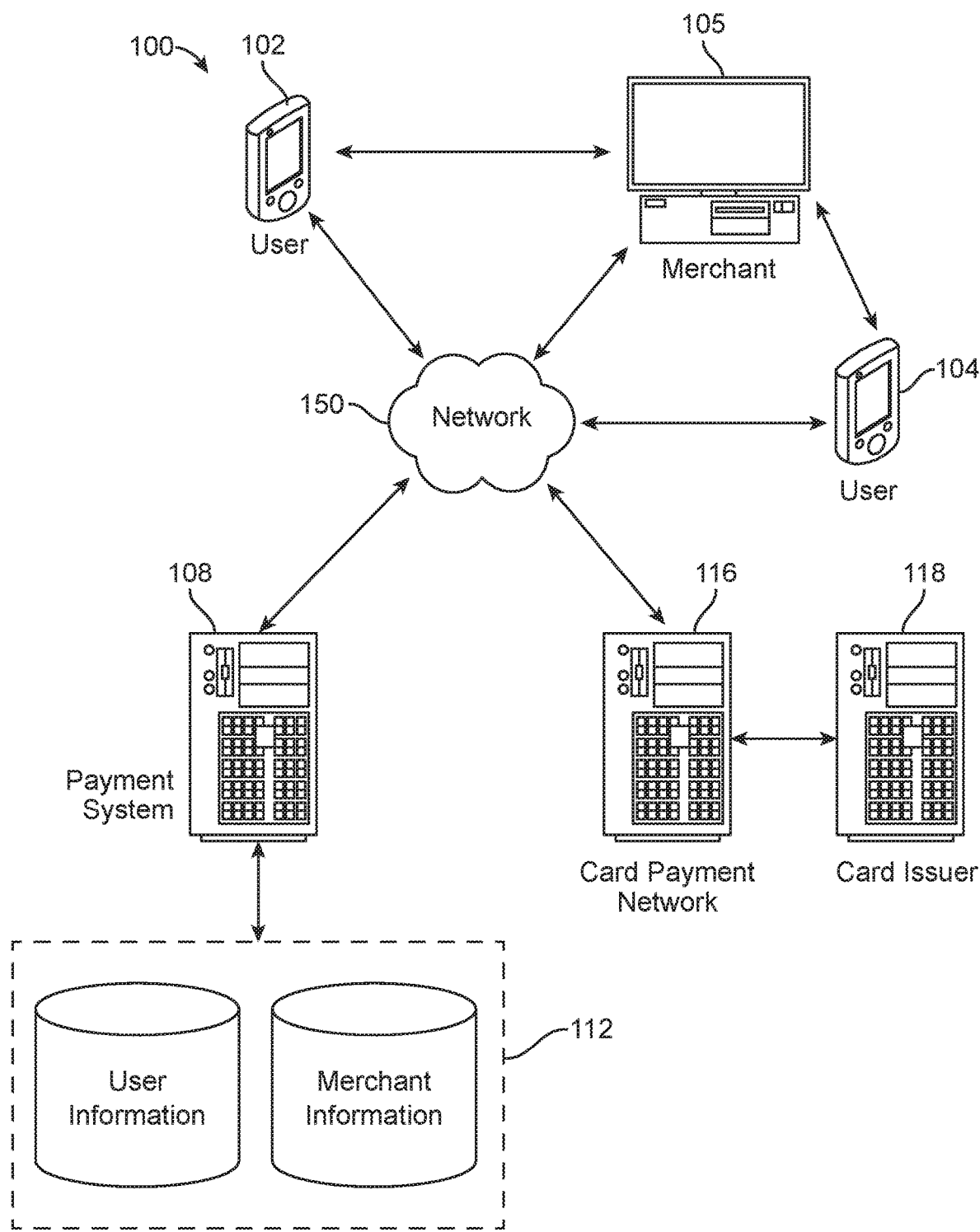
FIG. 1 illustrates an example environment for implementing a merchant payment system.

Systems and methods in accordance with various embodiments of the present disclosure overcome one or more of the above-referenced and other deficiencies in conventional approaches to conducting financial transactions.

In accordance with various embodiments, the point-of-sale system is a dual-screen stand assembly that includes a merchant terminal and a consumer (or "customer" as used interchangeably herein) terminal used in concurrently performing multiple point-of-sale transactions. The merchant terminal supports a merchant computing device and is oriented in a merchant facing direction to allow a merchant to interact with the merchant facing terminal. The consumer terminal is detachably mated to the merchant terminal and supports a consumer computing device that is oriented in a consumer-facing direction to allow one or more customers to interact with the customer-facing terminal. The merchant terminal and the consumer terminal can be detachably mated together in a fixed position to form a single unitary point of sale system including a merchant facing terminal and a consumer facing terminal. The terminals can also be separated from each other and arranged in a separated position with each terminal being physically independent of the other. One or more of the terminals can also be portable. The point-of-sale system can also support multiple customer terminals that communicate over a local network directly or more generally over a wider network to the merchant terminal. The point-of-sale system also includes a card reader as part of the customer terminal and/or the merchant terminal to perform a payment. The card reader is configured to accept swipe cards, chip cards (Europay, MasterCard and Visa hereinafter "EMV") or contactless (low power bluetooth or near-field communication, hereinafter "NFC") payments. The card reader can be part of one or both of the merchant terminal and the customer terminal.

As used herein, the term "point-of-sale transaction" refers to a transaction that takes place between a buyer and a seller that are physically present at a point-of-sale device. In the point-of-sale transaction, there is an item(s) (such as a good or a service) being offered for sale by a merchant to be purchased by a customer. Each point-of-sale transaction generally includes an "item input portion" which refers to the input of an item(s) that is received at a merchant terminal, and a "payment portion" in which payment for the item(s) is received. Advantageously, the point-of-sale system can input the item portion for multiple point-of-sale transactions concurrently without having to wait for the payment portion to complete for each one. In this manner, a merchant can input the item input portion of a first point-of-sale transaction for a first buyer in the merchant terminal, and control of the transaction can be transferred to the customer terminal so that the customer can then input the payment portion at a customer terminal, and while the first customer inputs the payment portion for the first transaction at the customer terminal, the merchant can initiate a second transaction for a second customer at the merchant terminal. The first customer can continue the payment process while the second point-of-sale transaction is processed and while the payment for the second point-of-sale transaction is processed. The payment for the second point-of-sale transaction can be processed by the merchant, by the first customer terminal after payment of the first point-of-sale transaction is complete, or at a second customer terminal. This allows the merchant to multi-task and process multiple transactions concurrently, while also allowing merchant to take control of a payment that is in progress if needed. It is possible for the payment portion for two or more point-of-sale transactions to be processed concurrently. For example, a merchant can perform the input portion for a first transaction and then transfer the first transaction to a first customer terminal for the first customer to perform payment of the first transaction. The merchant can then perform the input portion for a second transaction and transfer control of the second transaction to a second customer terminal for a second customer to perform payment of the second transaction. The payment for the first transaction and the second transaction can occur concurrently. The payment for the first transaction and the second transaction can also occur while a third transaction is entered into the merchant terminal in the item input portion of the transaction.

The point-of-sale system is configured to present an interface to the merchant terminal to receive selection of an item by the merchant regarding a first item for sale or a service being sold by the merchant in a first point-of-sale transaction. The information can then be put in a background state and control of the first point-of-sale transaction can be transferred to the customer terminal. The customer facing terminal thus performs the payment portion of the first point-of-sale transaction by a first customer interacting with the customer facing terminal while the merchant facing terminal is able to concurrently receive an item input portion for a second point-of-sale transaction. The merchant terminal can also perform the payment portion of the second transaction with the second customer at the merchant terminal while the payment for the first transaction is processed by the customer terminal. The payment portion of the second transaction can be performed by the customer terminal after completion of the payment portion of the first transaction. The payment portion of the second transaction can also be performed by the merchant terminal, for example, if the first customer is unable to complete the financial transaction. The payment portion of the first transaction can be processed before, or after, performing payment of the second transaction. For example, the merchant terminal can input the item portion for the first transaction, transfer control of the first transaction to the first customer terminal, and then the customer terminal can perform the payment portion while being operated by the first customer. Then, the item input for the second customer can be received by the merchant terminal. The merchant terminal can complete the payment portion of the second transaction and, upon completion, can also complete the payment of the first transaction if the first customer has still not completed the payment portion of the first transaction. Payment information acquired from the payment card at either the merchant terminal or the customer terminal, and the appropriate verification thereof, is provided to a payment system. Payment confirmation is received from the payment system, which can be displayed on one or both of the merchant terminal and the consumer terminal.

Other advantages, variations, and functions are described and suggested below as may be provided in accordance with the various embodiments. Reference is now made to FIG. 1 illustrating an example of an environment 100 for implementing a payment service network. Although a mobile device environment is described for purposes of explanation, different environments may be used, e.g., a web-based environment, to implement various embodiments. The example environment includes a payment system 108, which can be implemented as computer programs on one or more computers in one or more locations, in which the systems, components, and techniques described below can be implemented. The example environment also includes a user customer device 102, 104 and a merchant device 105. The customer and the merchant can also be connected locally via direct or wireless connection to communicate with each other over a local network, or can be connected over a worldwide distributed network, such as the Internet.

The customer device and the merchant device can each be a computer coupled to the payment system through a data communication network 150, e.g., the Internet. The customer device and the merchant device each generally include a memory, e.g., a random access memory (RAM), for storing instructions and data, and a processor for executing stored instructions. The customer device and the merchant device can each include one or more components, e.g., software or hardware, that are configured to respectively determine a geographic location of the customer device or the merchant device, using, for example, various geolocation techniques, e.g., a global positioning system (GPS). Further, the customer device and the merchant device can each be any appropriate device operable to send and receive requests, messages, or other types of information over the network. Some examples of customer devices include personal computers, cellular phones, handheld messaging devices, laptop computers, personal data assistants, tablet devices, and the like.

The network can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system, the merchant device, and the customer device can communicate over the network using wired or wireless connections, and combinations thereof.

As used in this specification, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

In an example embodiment, the point-of-sale system includes a single customer terminal and a single merchant terminal that can be secured together or detachably connected so that the customer terminal is portable. In another example embodiment, the point-of-sale system provides a plurality of customer devices (e.g. customer devices 102, 104) each locally (or networked) coupled to a merchant terminal (e.g. merchant terminal 105) for processing multiple point-of-sale transactions concurrently.

In some implementations, the payment system is configured to accept card-less payment transactions from customers, e.g., the customer. As used in this specification, a card-less payment transaction is a transaction conducted between the customer and a merchant at the point-of-sale during which a financial account of the customer is charged without the customer having to physically present a financial payment card or other physical instrument to the merchant at the point-of-sale. That is, the customer need not provide any details about the financial account, e.g., the credit card issuer or credit card number, for the transaction to be processed.

Before conducting card-less payment transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

The payment system is configured to perform card-less payment transactions. The payment system can include one or more servers that are configured to securely perform electronic financial transactions, e.g., electronic payment transactions, between a customer and a merchant, for example, through data communicated between the customer device and the merchant device. Generally, when a customer and a merchant enter into an electronic financial transaction, the transaction is processed by transferring funds from a financial account associated with the user account to a financial account associated with the merchant account.

The payment system is configured to send and receive data to and from the customer device and the merchant device. For example, the payment system can be configured to send data describing merchants to the customer device using, for example, the information stored in the merchant information database 112. For example, the payment system can communicate data describing merchants that are within a threshold geographic distance from a geographic location of the user device, as described in this specification. The data describing merchants can include, for example, a merchant name, geographic location, contact information, and an electronic catalogue, e.g., a menu, that describes items that are available for purchase from the merchant.

The payment system can also be configured to communicate with a computer system 616 of a card payment network, e.g., Visa or MasterCard, over the network, or over a different network, for example, to conduct electronic financial transactions. The computer system of the card payment network can communicate with a computer system 116 of a card issuer, e.g., a bank. There may be computer systems of other entities, e.g., the card acquirer, between the payment system and the computer system of the card issuer.

Figure 2:
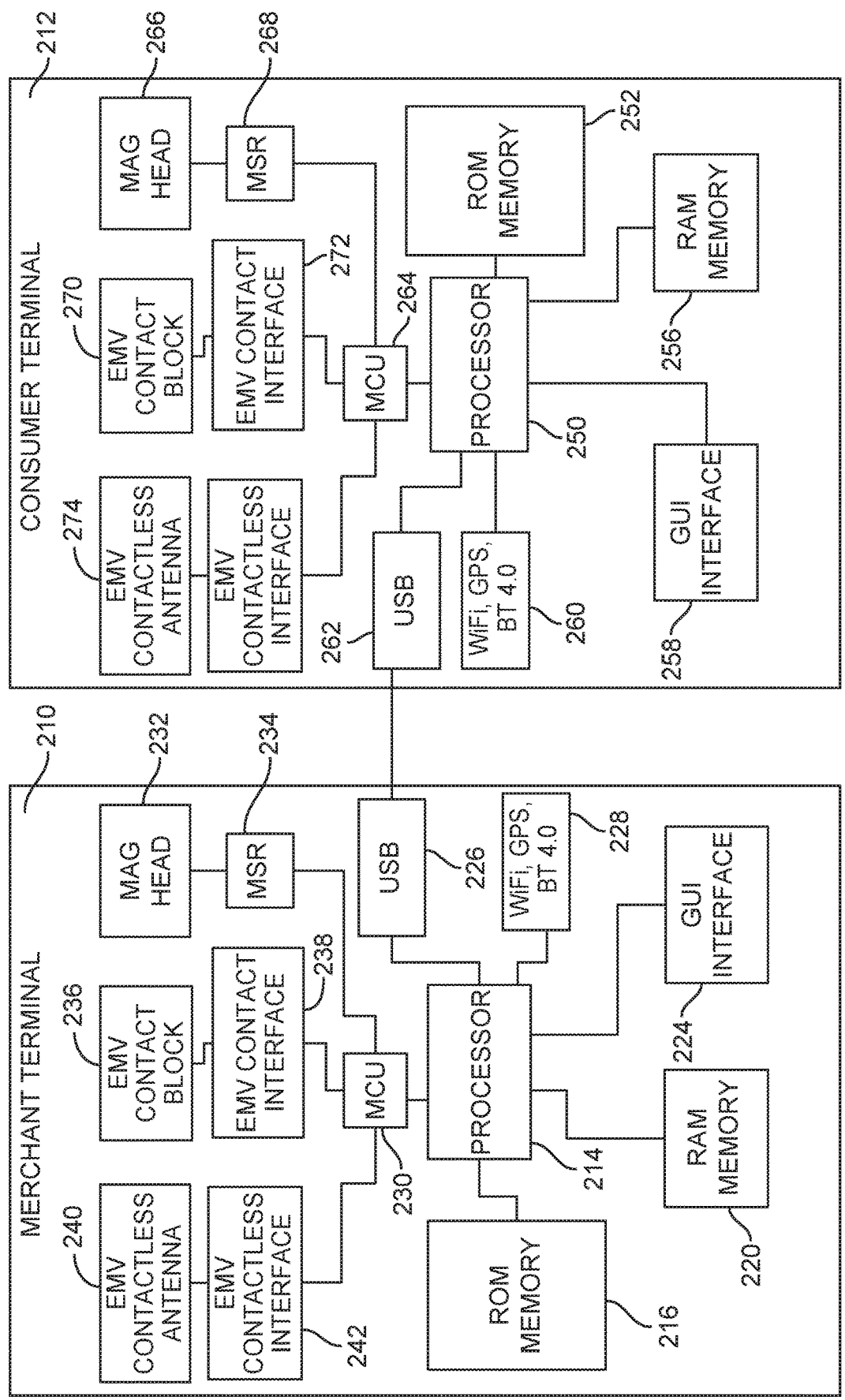
FIG. 2 illustrates an example schematic diagram of components of each terminal in the point-of-sale system in accordance with some embodiments.

Reference is now made to FIG. 2 illustrating an example schematic diagram of components of each terminal in the point-of-sale system in accordance with an embodiment. The point-of-sale system 200 includes a merchant terminal 210 and a consumer terminal 212 that can be detachably connected to each other.

The merchant terminal 210 includes a processor 214 and associated ROM memory 216 and RAM memory 220. The ROM memory can have a merchant register application stored thereon for presenting the merchant interface and interacting with the merchant interface. The processor 214 can be a SoC (system-on-chip) processor. A graphical user interface (GUI) 224 can be operatively connected to the processor for displaying various GUI displays on the merchant terminal.

The merchant terminal 210 and the consumer terminal 212 engage in bidirectional communication via the USB port 226 on the merchant terminal 210 which is coupled to the USB port 262 of the consumer terminal. It is also possible that the merchant terminal 210 and the consumer terminal 212 are not directly wired together, but instead communicate wirelessly, for example via WiFi transceiver 228 on the merchant terminal 210 and WiFi transceiver 260. The transceiver 228 and transceiver 260 can also include a GPS receiver and BlueTooth capabilities.

The merchant terminal 210 includes a microcontroller (MCU) 230 in communication with the processor 214. The merchant terminal 210 is capable of processing payments in this embodiment. A magnetic stripe card can be read by the magnetic head 232 and then sent by the Magnetic Stripe Reader (MSR) 234 to the MCU 230. EMV cards can be processed by direct contact using EMV contact block 236 that are read and provided to the MCU 230 by EMV contact interface 238. EMV contactless cards can be processed by the EMV contactless antenna 240 providing the signal to the EMV contactless interface 242 so that it can be provided to the MCU 230. The payment information is then given to the processor 214 to properly provide the information to the desired entity or entities. In this embodiment, both the merchant terminal and the consumer terminal have card readers and related components to perform the payment portion of the point-of-sale transactions, the card readers and related components including the magnetic head 232, MSR 234, EMV contact block 236, EMV contact interface 238, EMV contactless antenna and EMV contactless interface. In some embodiments, the merchant terminal can be free of any card readers so that the card readers are only found on the customer terminal(s). In this manner, a more streamlined merchant terminal can be provided that does not have the card readers and associated interconnections. The merchant terminal in that instance would only have an internal processor, ROM memory, RAM memory, a GUI interface and appropriate connectivity to the various networks, and payments of the item(s) would only be possible at the customer terminals.

The consumer terminal 212 includes a processor 250 and associated ROM memory 252 and RAM memory 256. A consumer application can be stored in ROM memory 252 to present an interface on the consumer terminal. The processor 250 can be a SoC processor. A GUI 258 can be operatively connected to the processor for displaying various GUI displays on the consumer terminal.

The consumer terminal 212 includes at least one USB port 262 for communicating, for example, with the merchant terminal 210. The consumer terminal 212 includes a WiFi transceiver that includes GPS and Bluetooth capabilities for communicating with the consumer terminal 212.

The consumer terminal 212 includes a microprocessor (MCU) 264 in communication with the processor 250. The consumer terminal 212 is capable of processing payments and includes readers for both magnetic stripe cards, and EMV cards, including both contact and contactless forms of payment. A magnetic stripe card can be read by the magnetic head 266 and the signal is acquired by the Magnetic Stripe Reader (MSR) 268 and send to the MCU 264. EMV cards can be processed by direct contact using EMV contact block 270 that is read, processed, and provided to the MCU 264 by the EMV contact interface 272. EMV contactless cards can be processed by the EMV contactless antenna 274 providing the signal to the EMV contactless interface so that it can be processed and provided to the MCU 264. The payment information is then given to the processor 214 to properly provide the information to the desired entity or entities.

Figure 3:
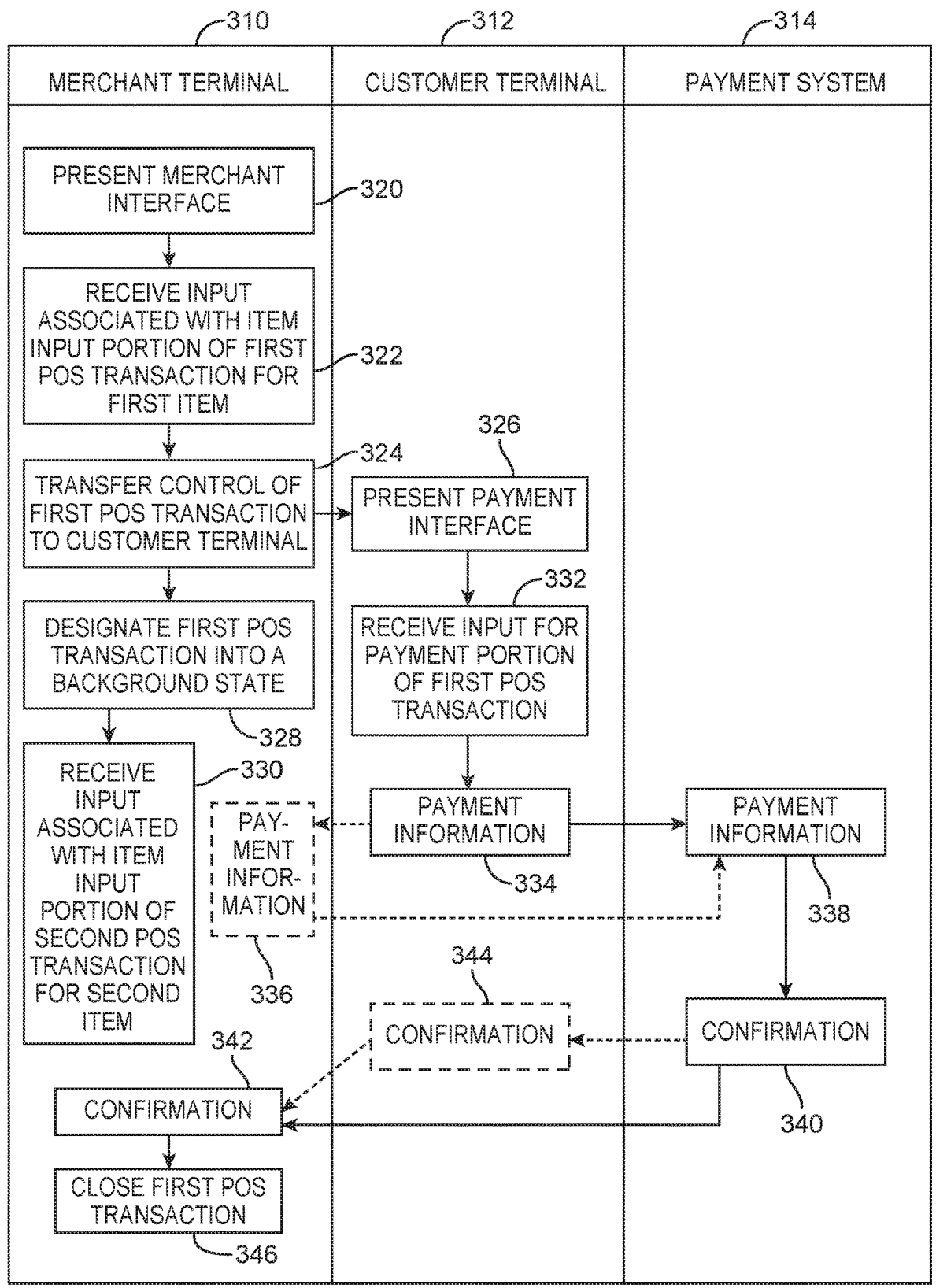
FIG. 3 illustrates an example diagram of flow of data between the components of the point-of-sale system in accordance with some embodiments.

Reference is now made to FIG. 3 illustrating an example diagram of flow of data between the components of the point-of-sale system in accordance with an embodiment. The flow of data between the merchant terminal 310, the consumer terminal 312 and the payment system 314 are shown in accordance with an example diagram. A merchant interface is presented 320 at the merchant terminal 310. The input associated with the item input portion of a first point of sale transaction for a first item is received 322 at the merchant terminal. This can be input directly by a merchant into a GUI of the merchant terminal. After the item input portion of the first item is complete, control of the first point of sale transaction is transferred 324 to the customer terminal 213. The payment interface is then presented 326 to the consumer on the consumer terminal. The consumer terminal receives input for the payment portion of the first point of sale transaction 332. The payment information is then acquired 334 by the consumer terminal and can be sent to the merchant terminal. Alternatively, the payment information can be sent directly 338 from the consumer terminal 312 to the payment system 314.

The first point-of-sale transaction can be designated into a background state 328 on the merchant terminal once the payment is initiated on the consumer terminal by a first customer and/or when the item input portion of the first point-of-sale transaction is completed by the merchant. The input associated with the item input portion of a second point-of-sale transaction for a second item can then be received 330 at the merchant terminal 310 for a second customer.

The item input portion of the second point-of-sale transaction can be received 330 by the merchant terminal 312 concurrently while the payment information 336 is also received by the merchant terminal 312. Also, although not shown, once the item input portion of a second point-of-sale transaction for a second customer is performed at 330 and completed, the control of the second point-of-sale transaction can be transferred to the consumer terminal 312 after the item input portion of the first transaction is completed by the first customer. An indicator can be displayed on the customer terminal once the first customer has completed the payment portion of the first transaction to indicate to the second customer that the second customer can perform the payment portion of the second transaction on the customer terminal. In an embodiment, a second consumer terminal can be provided in addition to and separate from the consumer terminal 312 for receiving the payment portion of point-of-sale transactions. In operation, a merchant receives the item input portion for a first point-of-sale transaction for a first customer. Control of the first point-of-sale transaction can be transferred to the consumer terminal for the first customer to perform payment of the first transaction. While the first customer performs payment, the merchant can receive an item input portion for a second item for a second transaction for a second customer. If the first customer is still not complete with the payment portion of the first transaction when the item input portion of the first transaction is complete, then a second customer terminal can be used to receive the payment portion for the second transaction from the second customer.

The payment system 314 receives payment information 338, either directly from the consumer terminal 312 or from the merchant terminal 310, and provides a confirmation 340, either confirming or denying availability of the payment funds. Confirmation of the payment is sent 344 to the consumer terminal 312 or 342 to the merchant terminal 310, or to both terminals in certain embodiments. Once confirmation 342 of the payment is received at the merchant terminal, the first point-of-sale transaction can be closed 346 by the merchant terminal 310.

Reference is now made to FIGS. 4A-14B showing various example views of merchant facing terminals and consumer facing terminals that are visible during the item input portion and the payment portion of multiple point-of-sale transactions.

FIG. 4A illustrates an example view of a merchant facing terminal of a point-of-sale system displaying a merchant graphical user interface (GUI) in a "null" or ready state, in accordance with an embodiment. As shown in FIG. 4A, an example GUI 410 is displayed on a merchant facing terminal. The GUI 410 can be displayed by a merchant application stored in memory of the merchant facing terminal that runs the merchant application. For example, the merchant application can be stored in ROM memory 216 of FIG. 2. The GUI 410 includes an input portion 420 that allows a merchant interacting with the merchant application to make selections. The GUI 410 includes a "ticket" portion 430 that displays details about the current ticket or tickets that are in the queue. Tickets that are in the "queue" have completed the item input portion of the point-of-sale transaction and have completed the payment portion of the point-of-sale transaction and the customer is still waiting for the item that is described in the point-of-sale transaction. By selecting on the item 422 in the input interface 420 of the GUI 410, a new item can be added to a ticket, and the merchant is directed to a screen for completing the item input portion, for example the GUI 510 in FIG. 5.

Figure 4B:
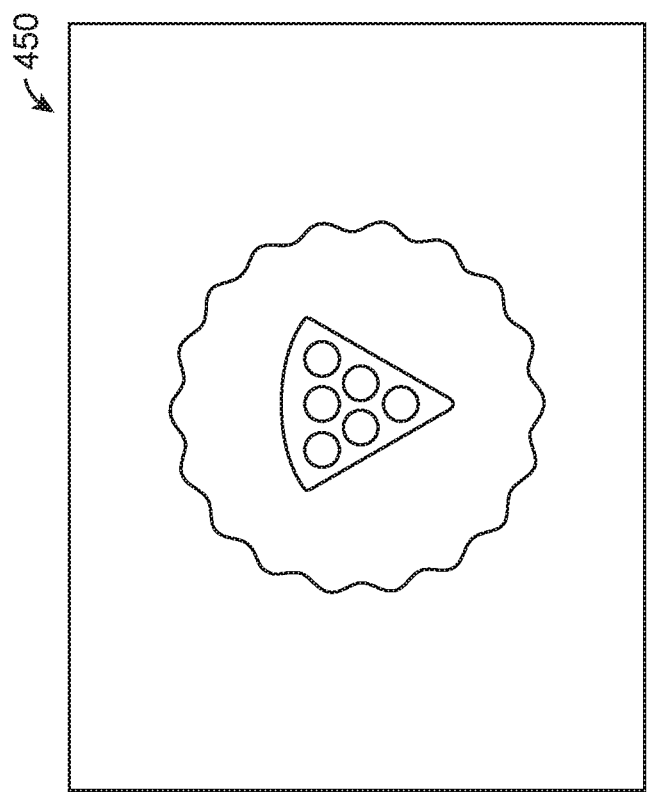
FIG. 4B illustrates an example view of a customer facing terminal of a point-of-sale system displaying a customer GUI in a ready state, in accordance with some embodiments.

FIG. 4B illustrates an example view of a customer facing terminal of a point-of-sale system displaying a customer GUI in a ready state, in accordance with an embodiment. The example GUI 450 is displayed on a customer facing terminal. The GUI 450 can be displayed by a customer application stored in memory of the customer facing terminal that runs the customer application. For example, the customer application can be stored in ROM memory 252 of FIG. 2.

Figure 5B:
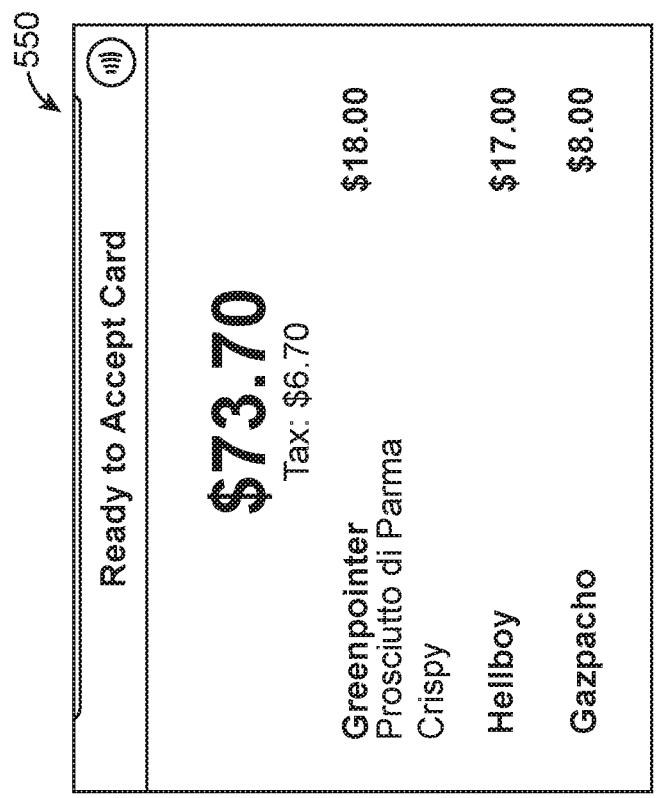
FIG. 5B illustrates an example view of a customer facing terminal and displaying the total cost for the item input portion, in accordance with some embodiments.

FIG. 5A illustrates an example view of a merchant facing terminal of a point-of-sale system displaying a merchant GUI 510 after a merchant has selected an item to input for a first point-of-sale transaction, in accordance with an embodiment. By selecting the total purchase amount 520, which is $73.70 for this example first point-of-sale transaction, the item input portion for the first point-of-sale transaction is now complete and the control of the first point-of-sale transaction can be transferred manually or automatically to the consumer terminal. An indicator can then prompt the first customer to initiate the payment portion for the first point-of-sale transaction, as shown in FIG. 5B. FIG. 5B illustrates an example view of a customer facing terminal and displaying a GUI 550 that shows the total cost for the item input portion, in accordance with an embodiment. The customer GUI 550 provides the customer with details of the order and the total cost due.

Figure 6A:
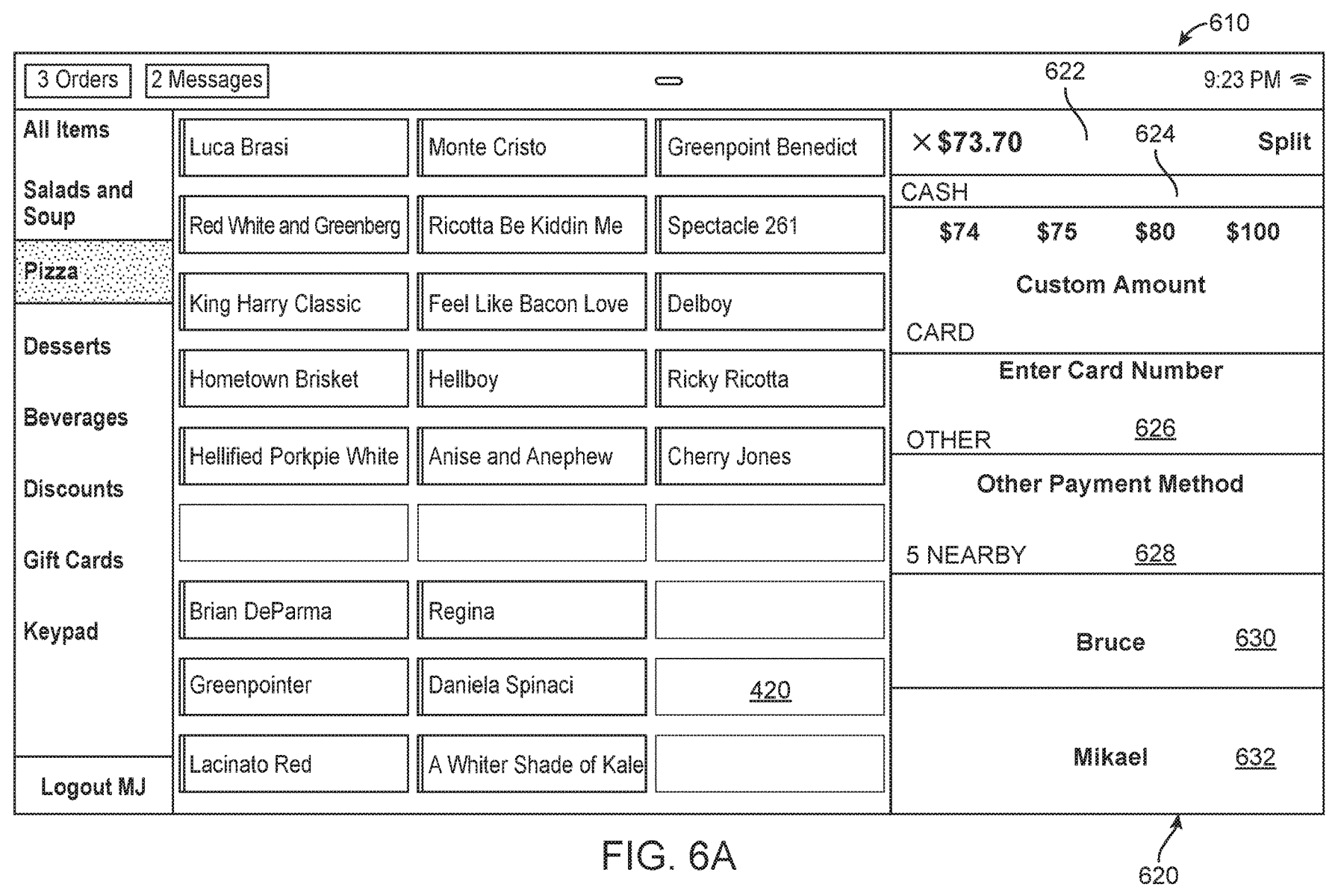

FIG. 6A illustrates an example view of a merchant facing terminal displaying a merchant GUI showing payment options, in accordance with an embodiment. The example GUI 610 is displayed on a merchant facing terminal. The GUI 610 can be displayed by a merchant application stored in memory of the merchant facing terminal that runs the merchant application. The GUI 610 provides merchants interacting with the merchant facing terminal with options for participating in the payment portion of the point-of-sale transaction. A merchant can select the item 622 to split the check, if desired. There are also several options for selecting cash 624 if the customer is paying with cash. The merchant can also enter a card number 626 or perform another payment method 628. Other orders 630 and 632 are also shown on GUI 610.

FIG. 6B illustrates an example view of a customer facing terminal displaying a customer GUI 650 that is prompting the customer to start the payment portion for the first point-of-sale transaction, in accordance with an embodiment. The customer GUI prompts a customer to initiate payment with a message 660, such as "Swipe, Dip or Tap to Pay".

A merchant interacting with the merchant application can now commence a second point-of-sale transaction with a second consumer on the merchant facing terminal while the payment portion of the first point-of-sale transaction is performed by the first consumer interacting with the customer application on the customer facing terminal. FIG. 7A illustrates an example view of a merchant facing terminal and displaying options available to a merchant once the item input portion of the first point-of-sale transaction is complete and control of the first point-of-sale transaction has been transferred to the customer facing terminal, in accordance with an embodiment. The merchant GUI 710 includes the item input interface 420 and an option 720 for entering a new ticket. As shown, there is a new group of tickets titled "in progress" 730 which includes the "current sale" 740, referring to the sale that has a complete item input portion but is waiting for the payment portion to be complete.

Figure 7B:
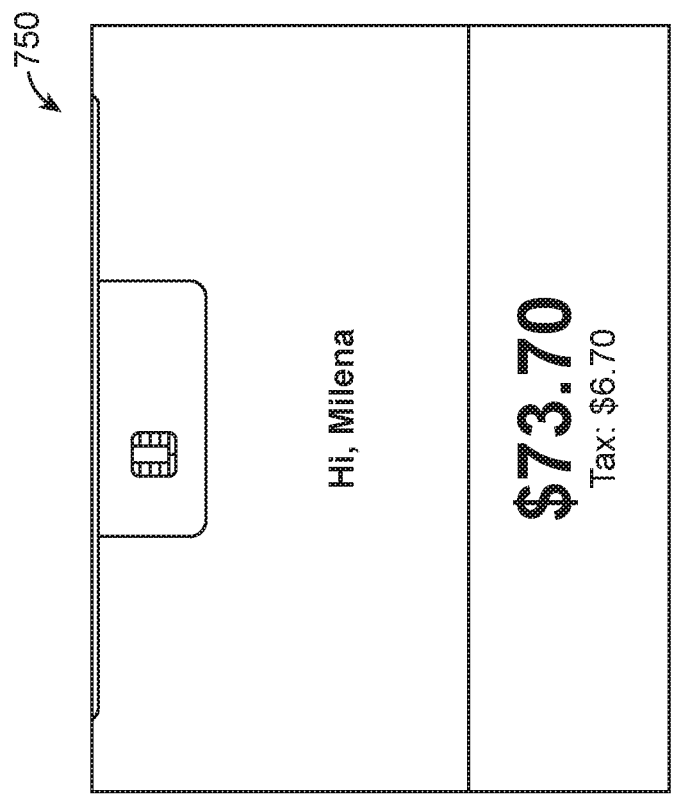
FIG. 7B illustrates an example view of a customer facing terminal displaying a customer GUI showing the customer continuing the payment portion of the first point-of-sale transaction, in accordance with some embodiments.

FIG. 7B illustrates an example view of a customer facing terminal displaying a customer GUI 750 showing the customer facing terminal after the payment portion of the first point-of-sale transaction has been initiated, for example by inserting a payment card, in accordance with an embodiment. As shown, a custom message can be displayed to the customer. The merchant is able to interact with the merchant application and enter another item in another point-of-sale transaction while the payment portion is processed on the customer terminal.

FIG. 8A illustrates an example view of a merchant facing terminal displaying a merchant GUI 810 for a merchant to initiate a second point-of-sale transaction, in accordance with an embodiment. The item input interface 420 allows the merchant to interact with the merchant application to add new items to the ticket. As shown by "New Ticket" 830, a new ticket has been started. The progress of the first point-of-sale transaction is also shown on the GUI 810 in an area 820 which displays the text "Choosing Account" for example, when a customer is still performing the payment portion of the first point-of-sale transaction.

Figure 8B:
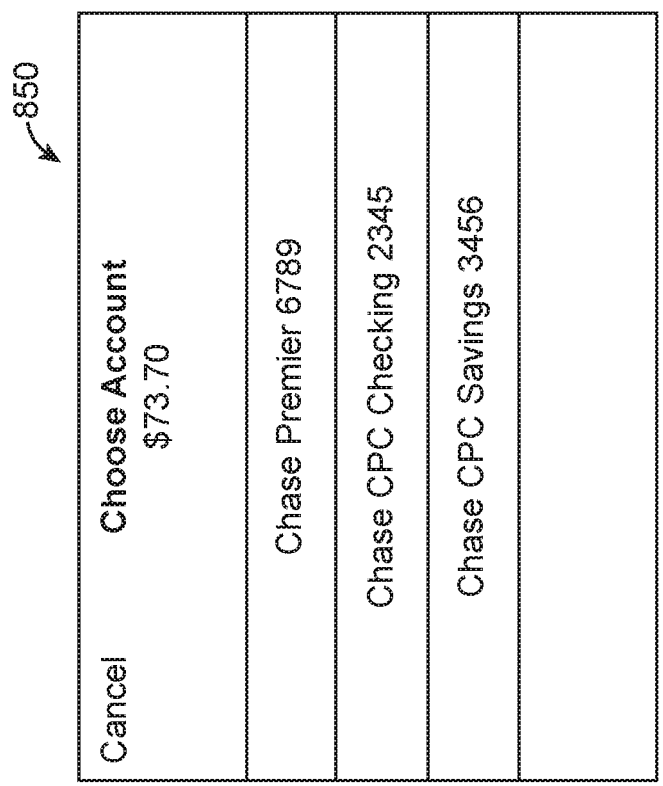
FIG. 8B illustrates an example view of a customer facing terminal displaying a customer GUI showing the customer continuing the payment portion of the first point-of-sale transaction, in accordance with some embodiments.

FIG. 8B illustrates an example view of a customer facing terminal displaying a customer GUI 850 showing the first customer continuing the payment portion of the first point-of-sale transaction, in accordance with an embodiment. As shown, the customer can select the account from which they wish to have the payment applied for the point-of-sale transaction. Note that the merchant is not tied up by any delays in the customer performing the payment portion and is able to input the item input portion for a second point-of-sale transaction while the payment portion if performed for a first point-of-sale transaction.

FIG. 9A illustrates an example view of a merchant facing terminal displaying a merchant GUI 910 with the options available to the merchant for participating in the payment portion of the first point-of-sale transaction, in accordance with an embodiment. The merchant is able to select the amount 920 or to cancel the sale 930 if desired.

Figure 9B:
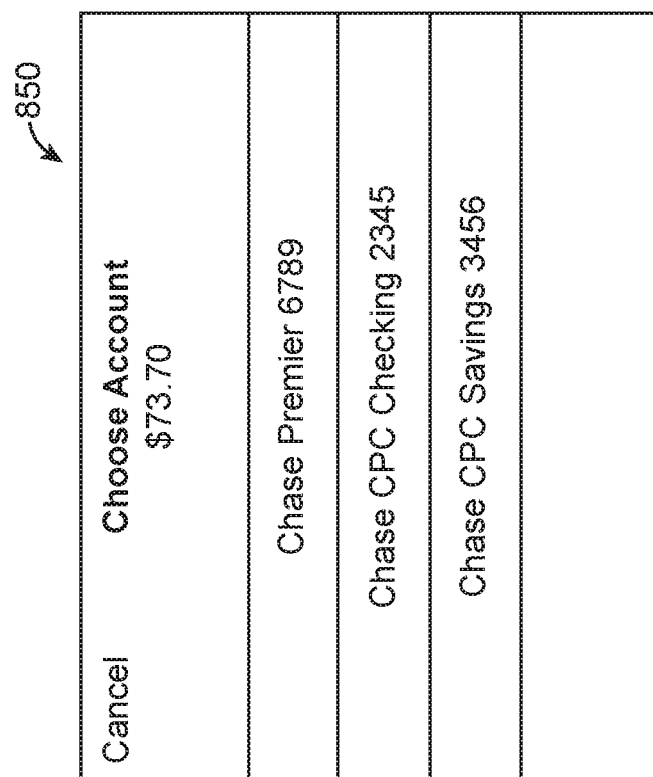
FIG. 9B illustrates an example view of a customer facing terminal displaying a customer GUI showing the customer continuing the payment portion of the first point-of-sale transaction, in accordance with some embodiments.

FIG. 9B illustrates an example view of a customer facing terminal displaying a customer GUI showing the first customer continuing the payment portion of the first point-of-sale transaction, in accordance with an embodiment, which can be displayed on the customer facing terminal at the same time as the GUI 910 is displayed in the merchant facing terminal.

FIG. 10A illustrates an example view of a merchant facing terminal displaying a merchant GUI 1010 for performing an item input portion for a second point-of-sale transaction with a second customer, in accordance with an embodiment. A new ticket 1032 for a second customer is started and by selecting item 1022 from the item input interface 420 a merchant creates a new ticket as shown in FIG. 11A.

Figure 10B:
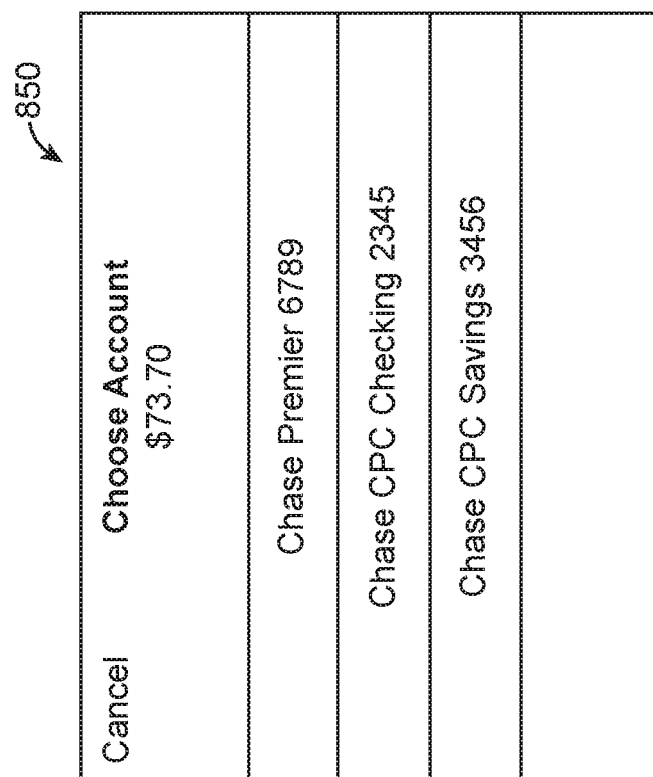
FIG. 10B illustrates an example view of a customer facing terminal displaying a customer GUI showing the customer continuing the payment portion of the first point-of-sale transaction, in accordance with some embodiments.

FIG. 10B illustrates an example view of a customer facing terminal displaying a customer GUI 850 showing the first customer continuing the payment portion of the first point-of-sale transaction, in accordance with an embodiment, which can be displayed to the first customer on the customer facing terminal at the same time as the GUI 1010 is displayed in the merchant facing terminal to the merchant interacting with the second customer.

FIG. 11A illustrates an example view of a merchant facing terminal displaying a merchant GUI for allowing a merchant to select the total amount of the sale and complete the item input portion for the second point-of-sale transaction, in accordance with an embodiment. After selecting, for example, item 1022 in FIG. 10A, a merchant is directed to a screen that shows the current sale, for example merchant GUI 1110. The current sale 1112 shows the items in the current point-of-sale transaction which is the second transaction in this embodiment. When a merchant selects the total price of the sale 1120 ($11.00 in this example diagram) the item input portion for the point-of-sale transaction is complete. The transaction can then be automatically or manually transferred to a customer terminal to perform the payment portion. The payment portion of the point-of-sale transaction can also be performed by the merchant using the merchant application.

Figure 11B:
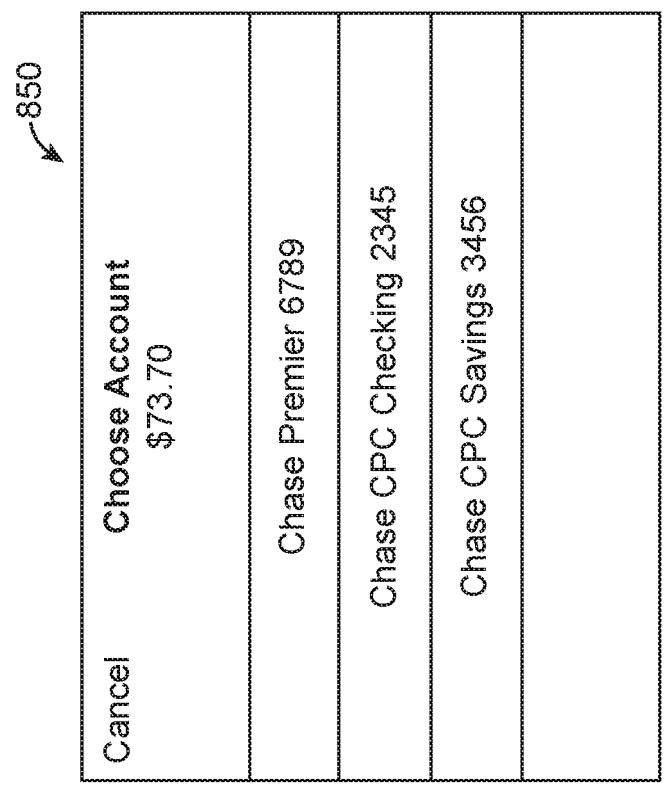
FIG. 11B illustrates an example view of a customer facing terminal displaying a customer GUI showing the customer continuing the payment portion of the first point-of-sale transaction, in accordance with some embodiments.

FIG. 11B illustrates an example view of a customer facing terminal displaying a customer GUI 850 showing the first customer continuing the payment portion of the first point-of-sale transaction, in accordance with an embodiment, which can be displayed on the customer facing terminal at the same time as the GUI 1110 is displayed in the merchant facing terminal to a merchant interacting with a second customer.

Figure 12A:
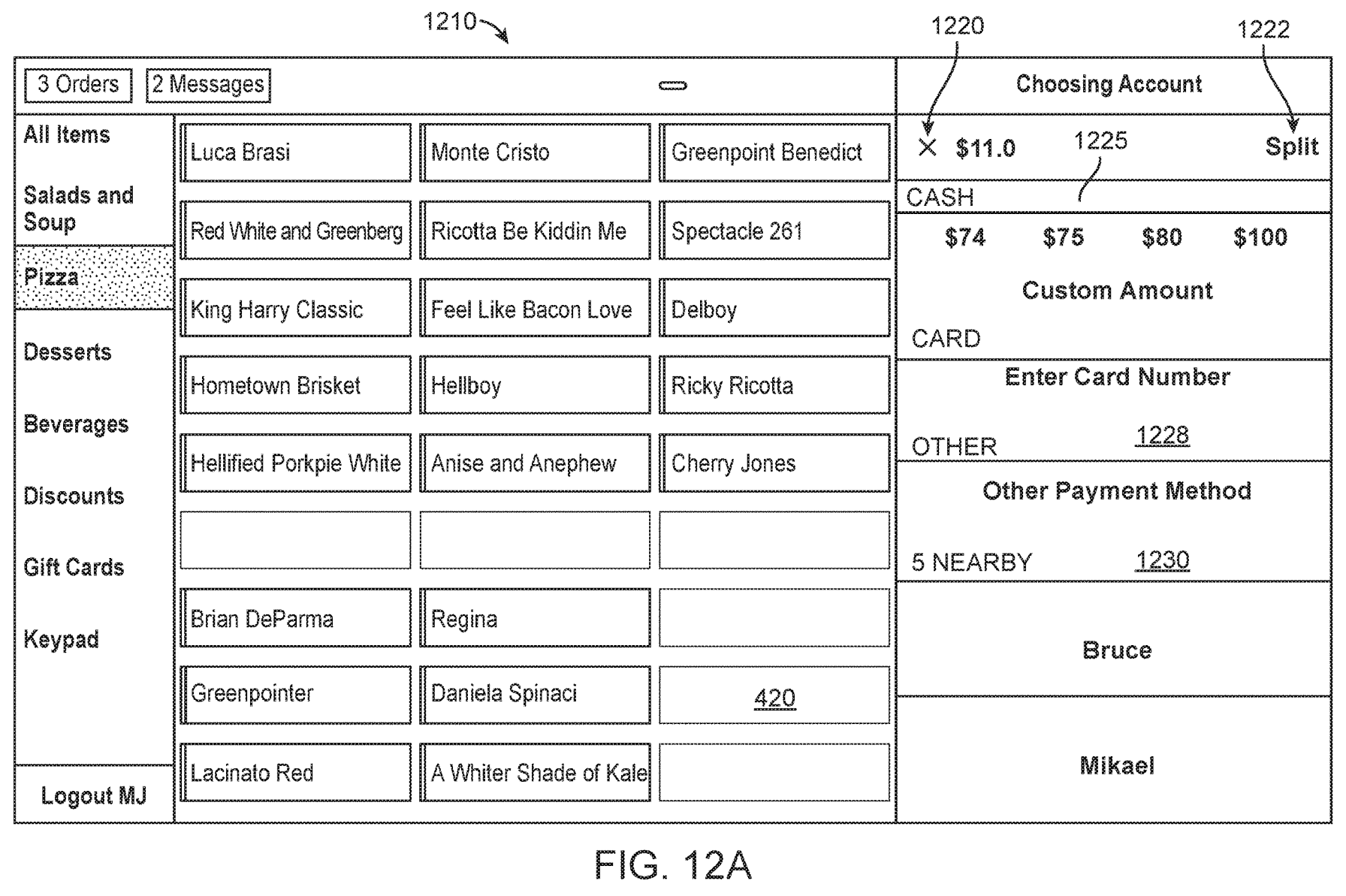

FIG. 12A illustrates an example view of a merchant facing terminal displaying a merchant GUI 1210 showing options available to merchant for performing the payment portion of the second point-of-sale transaction, in accordance with an embodiment. In this example embodiment, the merchant performs the payment portion of the second point-of-sale transaction for the second customer while the first customer performs the payment portion of the first point-of-sale transaction. In other example embodiments, the payment portion for the second point-of-sale transaction can be performed by the second customer at the customer terminal after the payment portion of the first point-of-sale transaction is complete by the first customer. In still other example embodiments, the payment portion for the second point-of-sale transaction can be performed by a second customer terminal, thereby allowing a third point-of-sale transaction for a third customer to be input by the merchant terminal while the payment portion for the first point-of-sale transaction is processed for the first customer at the first customer terminal and while the payment portion of the second point-of-sale transaction is also processed for the second customer at the second customer terminal.

In the merchant GUI 1210, the merchant can split the check by selecting "split" 1222. The merchant can exit out of the payment options by selecting the "X" 1220, or can enter cash options 1225 if the customer is paying with cash. The merchant can also enter a card number 1228 or enter another payment method 1230 to perform the payment on the merchant terminal.

FIG. 12B illustrates an example view of a customer facing terminal displaying a customer GUI showing the first customer continuing the payment portion of the first point-of-sale transaction, in accordance with an embodiment, which can be displayed on the customer facing terminal at the same time as the GUI 1210 is displayed in the merchant facing terminal for a second customer.

FIG. 13A illustrates an example view of a merchant facing terminal displaying a merchant GUI 1310 showing a merchant's ability to make a selection of a dollar amount to be paid to the merchant, in accordance with an embodiment. A merchant indicates the amount of money the second customer has provided to the merchant ($11 in this embodiment) by selecting the $11 amount 1320.

Figure 13B:
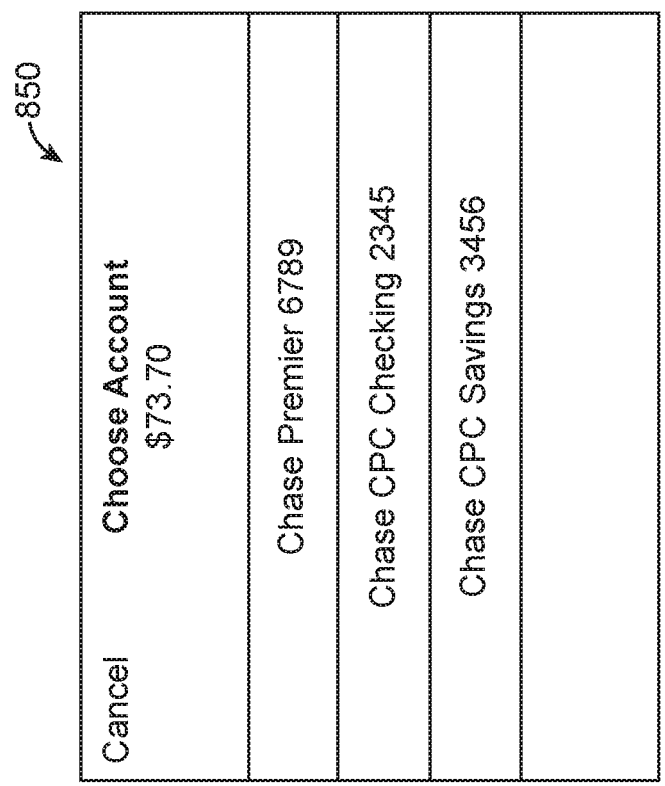
FIG. 13B illustrates an example view of a customer facing terminal displaying a customer GUI showing the customer continuing the payment portion of the first point-of-sale transaction, in accordance with some embodiments.

FIG. 13B illustrates an example view of a customer facing terminal displaying a customer GUI showing the first customer continuing the payment portion of the first point-of-sale transaction, in accordance with an embodiment, which can be displayed on the customer facing terminal at the same time as the GUI 1310 is displayed in the merchant facing terminal for a second customer.

FIG. 14A illustrates an example view of a merchant facing terminal displaying a merchant GUI 1410 showing the monetary amount of change available to a customer of the second point-of-sale transaction, in accordance with an embodiment. A display box 1420 shows the amount of change that can be provided to a customer in accordance with an example embodiment where $73.75 was provided to the merchant and the change due is $0.05. A merchant can select "OK" 1422 to complete the payment portion of the point-of-sale transaction, or can select "Queue the Receipt" 1424 to queue the receipt.

Figure 14B:
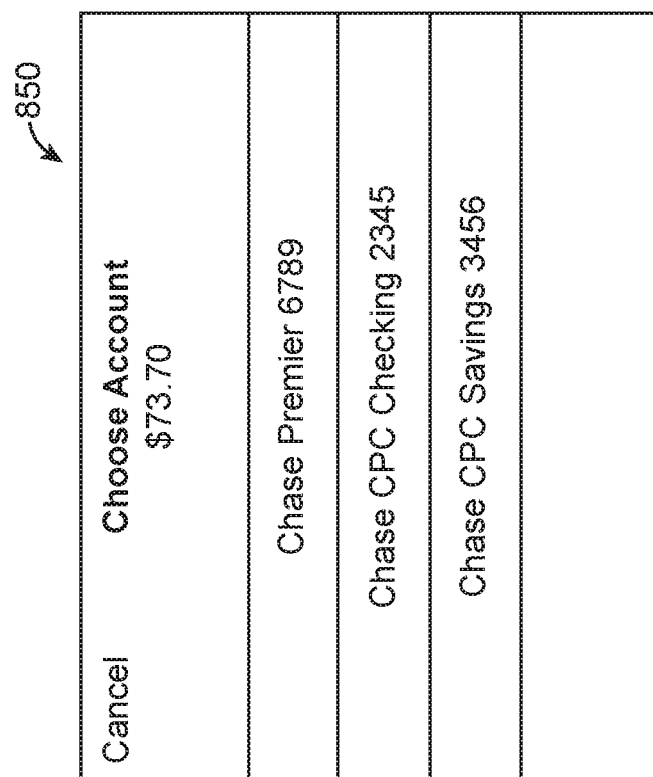
FIG. 14B illustrates an example view of a customer facing terminal displaying a customer GUI showing the customer continuing the payment portion of the first point-of-sale transaction which occurs concurrently with the item input portion and, in this case, the payment portion of the second point-of-sale transaction, in accordance with some embodiments.

FIG. 14B illustrates an example view of a customer facing terminal displaying a customer GUI showing the first customer continuing the payment portion of the first point-of-sale transaction which occurs concurrently with the item input portion and, in this case, the payment portion of the second point-of-sale transaction, in accordance with an embodiment, which can be displayed on the customer facing terminal at the same time as the GUI 1410 is displayed in the merchant facing terminal for a second customer.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
presenting information on a merchant user interface of a merchant computing device, the merchant user interface including a first window for receiving a first input associated with a first item of a first point-of-sale (POS) transaction;
receiving, via the merchant computing device, the first input associated with the first item, the first input including at least one selection of an item, the item being a good or a service sold by a merchant associated with the merchant computing device; and
in response to receiving input, including the first input, associated with the first POS transaction:
presenting, in a second window of the merchant user interface, a status of the first POS transaction with respect to a customer-facing interface associated with a customer computing device or the merchant computing device;
transferring control of the first POS transaction from the merchant computing device to the customer computing device such that receiving input associated with payment of the first POS transaction is enabled on the customer computing device;
receiving, at the first window of the merchant user interface and concurrently with presentation of the status of the first POS transaction in the second window, a second input associated with a second POS transaction, the second input including at least one selection of a second item;
receiving a payment input via a customer user interface, the payment input indicating payment information pertaining to the first POS transaction, the payment input received at the customer user interface concurrently with the second input associated with the second POS transaction at the merchant user interface while continuing to display, in the second window on the merchant user interface, the status of the first POS transaction; and
receiving, a notification of confirmed payment for the first POS transaction.

2. The method of claim 1 further comprising transferring control of the second POS transaction to the customer computing device after receiving input, including the second input, associated with the second POS transaction.

3. The method of claim 1 further comprising transferring control of the second POS transaction to the customer computing device after receiving input, including the second input, associated with the second POS transaction and after receiving the notification of the confirmed payment of the first POS transaction.

4. The method of claim 1 further comprising displaying an indicator on the customer computing device to indicate at least one step to provide the payment input for the first POS transaction.

5. The method of claim 1, further comprising transferring control to the customer computing device by direct connection between the merchant computing device and the customer computing device.

6. The method of claim 1, further comprising transferring control to the customer computing device by wireless connection between the merchant computing device and the customer computing device.

7. The method of claim 1, further comprising initiating, after receiving the input associated with the first POS transaction and after receiving the input associated with the second POS transaction, but before closing the first POS transaction or the second POS transaction, a third POS transaction.

8. The method of claim 1, further comprising:
displaying a third window on the merchant user interface, the third window displaying a list of queued POS transactions having an item-input portion and the payment portion completed.

9. The method of claim 1, further comprising:
displaying an indicator on the customer computing device based at least in part on the first payment portion of the first POS transaction being complete.

10. A point-of-sale (POS) system comprising:
a customer computing device that displays a customer user interface configured to receive a first input of payment information for a first POS transaction during a payment portion of the first POS transaction; and
a merchant computing device configured to display a merchant user interface on the merchant computing device, the merchant computing device configured to:
receive, at a first window of the merchant user interface, the first input associated with a first item of the first POS transaction;
present, at a second window of the merchant user interface, a status of the first POS transaction with respect to the customer computing device;
receive, at the first window and concurrently with presentation of the status of the first POS transaction at the second window of the merchant user interface, a second input associated with a second POS transaction, the second input including at least one selection of a second item; and
receive, a notification of a confirmed payment of the first POS transaction, the payment input received at the customer user interface concurrently with the second input associated with the second POS transaction at the merchant user interface while continuing to display, in the second window on the merchant user interface, the status of the first POS transaction.

11. The point-of-sale system of claim 10, wherein the customer computing device comprises a first customer computing device, and the system further comprises a second customer computing device.

12. The point-of-sale system of claim 10, wherein the customer computing device is fixedly attached to the merchant computing device.

13. The point-of-sale system of claim 10, wherein the customer computing device is detachably secured to the merchant computing device and the customer computing device is portable.

14. The point-of-sale system of claim 10, wherein the merchant computing device is configured to close the first POS transaction based at least in part on receiving a payment notification from the customer computing device.

15. The point-of-sale system of claim 10, wherein the status includes information regarding content displayed on the customer computing device.

16. The point-of-sale system of claim 10 wherein:
at least one of the merchant computing device or the customer computing device is configured to accept at least one of:
a magnetic strip card;
a chip-type card; or
a cardless payment type.

17. The point of sale system of claim 10, the operations further comprising processing a second payment portion for the second POS transaction on the merchant computing device concurrently with the payment portion for the first POS transaction being processed on the customer computing device.

18. The point of sale system of claim 10, wherein the merchant computing device and the customer computing device are configured to communicate bidirectionally with each other.

19. A non-transitory computer readable medium comprising: computer executable instructions stored thereon, that when executed cause a computer to:
display information on a merchant user interface of a merchant computing device, the merchant user interface including a first window configured to receive a first input for a first point-of-sale (POS) transaction;
receive, via the merchant computing device, the first input associated with the first item, the first input including at least one selection of an item, the item being a good or a service sold by a merchant associated with the merchant computing device;
present, in the first window of the merchant user interface, input associated with the first POS transaction as received at a customer computing device;
present, in a second window of the merchant user interface, a status of the first POS transaction on the customer computing device, wherein the status changes dynamically based on the input received via the customer computing device; and
receive, at the first window of the merchant user interface and concurrently with presentation of the status of the first POS transaction in the second window of the merchant user interface, a second input associated with an item-input portion of a second POS transaction at the merchant user interface while the second window of the merchant user interface displays the status.

20. The non-transitory computer readable medium of claim 19, wherein the instructions further cause a computer to:
finalize and close the first POS transaction after a payment portion of the first POS transaction has completed on the customer computing device.

21. The non-transitory computer readable medium of claim 19, wherein control of the first POS transaction is transferred to the customer computing device from the merchant computing device based at least in part on the item-input portion for the first POS transaction being complete.

22. The non-transitory computer readable medium of claim 19, wherein the customer computing device comprises a first customer computing device and control of the second POS transaction is transferred to a second customer computing device from the merchant computing device after completion of the item-input portion of the second POS transaction and after payment confirmation of the first POS transaction.

* * * * *

UNITED STATES PATENT AND TRADEMARK OFFICE
CERTIFICATE OF CORRECTION

| | |
|---|---|
| PATENT NO. | : 10,783,508 B1 |
| APPLICATION NO. | : 15/142966 |
| DATED | : September 22, 2020 |
| INVENTOR(S) | : Bruce Bell et al. |

It is certified that error appears in the above-identified patent and that said Letters Patent is hereby corrected as shown below:

On the Title Page

Column 1, item (72), change "Gerald" to --Gerard--.

Signed and Sealed this
First Day of August, 2023

Katherine Kelly Vidal
*Director of the United States Patent and Trademark Office*